Aug. 1, 1967 — O. HARDY — 3,333,360
SIMULATED EGG LAYING TOY
Filed April 26, 1965
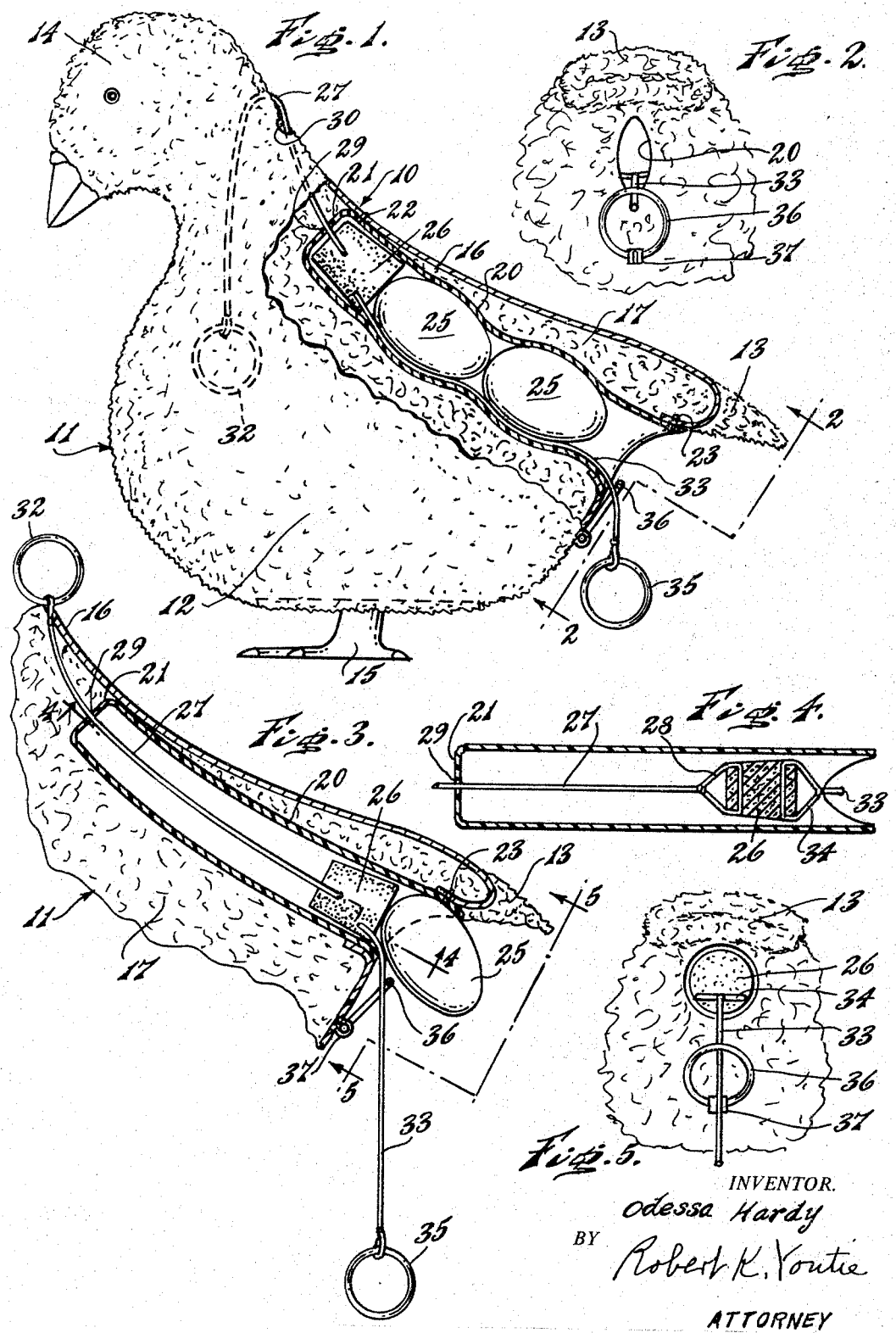
INVENTOR.
Odessa Hardy
BY Robert K. Youtie
ATTORNEY

United States Patent Office 3,333,360
Patented Aug. 1, 1967

3,333,360
SIMULATED EGG LAYING TOY
Odessa Hardy, Newtonville, N.J.
(5 Mattoon St., Springfield, Mass. 01105)
Filed Apr. 26, 1965, Ser. No. 450,829
6 Claims. (Cl. 46—124)

This invention relates generally to toys, and is especially concerned with a unique toy simulating the function of an egg-laying animal.

It is an important object of the present invention to provide a toy of the type described which is highly attractive in appearance, adapted to present the appearance of a hen or other egg-laying animal, and wherein the egg-laying function may be simply and easily effected, even by relatively small children.

It is another object of the present invention to provide a simulated egg-laying animal toy having the advantageous characteristics mentioned in the preceding paragraph, which is extremely simple in construction, safe and durable throughout a long useful life, which is entirely reliable in operation, and which can be economically manufactured for sale at a reasonable price.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

In the drawings:

FIGURE 1 is a side elevational view showing an egg-laying toy constructed in accordance with the teachings of the present invention, partly broken away for clarity of understanding, and illustrating the toy prior to its egg-laying operation;

FIGURE 2 is a partial rear elevational view taken generally along the line 2—2 of FIGURE 1;

FIGURE 3 is a partial sectional elevational view similar to FIGURE 1, but illustrating a final stage of the egg-laying operation;

FIGURE 4 is a partial sectional view taken generally along the line 4—4 of FIGURE 3; and FIGURE 5 is a partial rear elevational view taken generally along the line 5—5 of FIGURE 3.

Referring now more particularly to the drawings, and specifically to FIGURE 1 thereof, the toy of the present invention is there generally designated 10, and may include an animal body 11 simulating the appearance of any desired egg-laying animal. In the illustrated embodiment, the animal body 11 assumes the configuration of a hen having a main body portion 12, a rearwardly extending tail 13, and an upwardly and forwardly extending head 14. If desired, feet 15 may project from the underside of the main body portion 12. In practice, the animal body 11 may be fabricated of an outer envelope or skin 16, of suitable flexible sheet material having the desired shape, and stuffed or filled with soft yieldable stuffing material of any suitable type, as at 17. In this manner, the animal body 11 is form-retaining while being yieldable and soft to touch.

Interiorly of the animal body 11, embedded in the filling 17 is an elongate tube or sack 20, advantageously fabricated of suitable flexible sheet material, such as plastic, fabric, or the like. The sack 20 is of generally elongate configuration, arranged within the body 11 extending generally forwardly and rearwardly thereof, and may have its forward end closed, as at 21. In the illustrated embodiment, the tubular or elongate sack 20 extends forwardly and upwardly, its closed end 21 terminating adjacent to the head 14, and may be secured in position by stitching 22, or other suitable means securing the forward sack end to the envelope 16. The rearward sack end may be open, and preferably terminates adjacent to and below the tail 13, being secured in position by stitching 23, or other suitable securing means. Thus, the elongate sack 20 inclines forwardly and declines rearwardly.

The sack 20 has a cross-sectional size and configuration adapted to receive one or more egg-simulating articles 25 within the sack. In the illustrated embodiment of FIGURE 1, a pair of egg-simulating articles 25 are arranged in a row within the sack, but the sack may be of lesser or greater extent to accommodate less or more articles, as desired.

Arranged slidably within the elongate sack 20 is a plug-shaped member or pusher 26. The pusher 26 may be of generally cylindrical, or frusto-conical configuration and sized for free sliding movement forwardly and rearwardly longitudinally along and within the sack 20. In the illustrated condition of FIGURE 1 the pusher 26 is located at its innermost position, adjacent to the closed sack end 21.

An elongate, flexible retracting element or cord 27 is connected to the forward or inner end of pusher plug 26, as by a loop 28 extending through the pusher, see FIGURE 4. From the pusher, the flexible retracting element 27 extends slidably through an opening or hole 29 in the closed sack end 21, thence forwardly through stuffing material, and finally slidably outward through an opening 30 formed in the envelope 16. In general, the retracting element 27 extends forwardly from the forward end of pusher 26 exteriorly of the animal body 11. Provided on the exterior end of the retracting element 27 may be a manual-gripping member 32, such as a ring, of a size greater than that of envelope opening 30 to retain the distal end of the retracting element exteriorly of the body.

An additional flexible elongate element is designated 33, and has one end connected by a loop 34, see FIGURE 4, to the rear or outer end of pusher 26. From the pusher, the flexible cord or actuating element 33 extends rearwardly through the sack 20 and outward through the open rear end thereof. The distal or remote end of flexible actuating element 33 may also be provided with a handgrip member or ring 35 externally of the body 11. A guide loop or ring 36 is located adjacent to the open rear end of sack 20, the actuating element 33 extending spacedly through the ring 36, and the latter being secured, as by stitching 37 to the animal-shaped body 11. Thus, the ring 36 serves to guide sliding movement therethrough of the actuating element 33, and the handgrip 35 is sized to prevent its passage inward through ring 36 and into the sack 20.

In operation, it is only required that the retracting element 27 be pulled, as by grasping of the handgrip 32, to effect inward sliding movement or retraction of the pusher 26 to its innermost position of FIGURE 1. One or more egg-simulating articles 25 may then be inserted sequentially into the sack 20 through the open rear end thereof. When it is desired to simulate the egg-laying operation, the handgrip or ring 35 may be gently pulled to effect forward sliding of the pusher 26 in the sack 20, with the articles 25 being moved ahead of the pusher. Discharge of the innermost or final article 25, in egg-laying fashion, is illustrated in FIGURE 3. Of course, the above-described procedure may be repeated, as desired.

From the foregoing, it is seen that the present invention provides a toy adapted to simulate an egg-laying animal, which toy fully accomplishes its intended objects and is well adapted to meet practical conditions of manufacture and use.

Although the present invention has been described in some detail by way of illustration and example for purposes of clarity of understanding, it is understood that certain changes and modifications may be made within the spirit of the invention and scope of the appended claims.

What is claimed is:

1. A toy adapted to simulate the laying of eggs, said toy comprising a body of soft yieldable material having the configuration of an egg-laying animal, an elongate sack in said body having one end closed and its other end opening rearwardly through said body, said sack being sized to slidably receive a row of egg-simulating articles, a pusher movable in said sack longitudinally therealong between the closed and open ends thereof, an elongate flexible retracting element connected to said pusher and extending through the closed sack end exteriorly of said body for retracting said pusher toward the closed sack end, and an elongate flexible actuating element connected to said pusher and extending through the open sack end for effecting pusher movement toward the open sack end, whereby a row of said articles in said sack are adapted for sequential dispensing from said sack upon pusher movement toward said open sack end.

2. A toy according to claim 1, said retracting element extending slidably through said closed sack end and a forward region of said body for forward movement of said retracting element to retract said pusher.

3. A toy according to claim 1, in combination with guide means fixed to said body adjacent to the open sack end and slidably receiving said actuating element to guide the latter outwardly through said open sack end.

4. A toy according to claim 1, said pusher comprising a plug slidable in said sack, said retracting element being connected to the inner end of said plug and said actuating element being connected to the outer end of said plug.

5. A toy according to claim 1, said body being in the configuration of a hen having a forward head and rearward tail, said sack having its closed end forward and its open end adjacent to and below said tail.

6. A toy according to claim 1, in combination with handgrip means on the external ends of said retracting and actuating elements for manually drawing the same, said handgrip means being sized to prevent their entry into said body.

References Cited

UNITED STATES PATENTS

| | | | |
|---|---|---|---|
| 2,256,340 | 9/1941 | Gora et al. | 46—124 |
| 3,056,530 | 10/1962 | Krier | 221—267 X |
| 3,112,046 | 11/1963 | Szekely | 221—267 X |

RICHARD C. PINKHAM, *Primary Examiner.*

R. F. CUTTING, *Assistant Examiner.*